United States Patent Office 2,964,414
Patented Dec. 13, 1960

2,964,414
GLASS COMPOSITION AND METHOD OF MAKING IT

Robert H. Dalton and George B. Hares, Corning, N.Y., assignors to Corning Glass Works, Corning, N.Y., a corporation of New York No Drawing. Filed Apr. 23, 1958, Ser. No. 730,253

4 Claims. (Cl. 106—53)

This invention relates to novel soft electrical glasses having high electrical resistivities.

Soft electrical glasses are glasses used extensively for the manufacture of parts utilized in the fabrication of various electrical devices such as incandescent lamps, electronic discharge tubes, and the like. These glasses have particular utility because they can be sealed to fabricated glass parts at temperatures which will not distort the shape of these previously fabricated parts and have high enough volume resistivities to act as insulating means. (Volume resistivity is the longitudinal resistance in ohms per unit length of a uniform bar of unit sectional area.) Hence, they are particularly useful for the manufacture of stems and flares for incandescent lamps, for the production of tubing for use in television picture tubes, fluorescent lamps, and other electronic discharge devices, and for other purposes. Improvements in the design of electronic components and circuits have resulted in the demand for glasses to be used for such purposes which can withstand higher voltages across smaller sections at higher operating temperature, thus requiring that the glasses have higher volume resistivities at elevated temperatures.

The soft glass compositions which have heretofore been used for such applications have included silica, lead oxide, and one or more of the usual alkali metal oxides. While the term "alkali metal oxides" is accepted in the glass-making art as meaning soda and potash and in some instances lithia (Glass Glossary, The American Ceramic Society Bulletin, vol. 27, No. 9, pp. 353–62, 1948), it is hereinafter used in the specification and claims in the literal chemical sense to mean an oxide of any of the elements of the first group of the periodic table, consisting of lithium, sodium, potassium, rubidium, and cesium.

An object of this invention is to increase the resistivity of soft electrical glasses.

Other objects will become apparent to one skilled in the art from the following description taken together with the illustrative examples which are given by way of explanation and should not be deemed to be limitations on the scope thereof.

All percentages and proportions of constituents of glass compositions hereinafter set forth are by weight unless otherwise stated.

We have found that the resistitivities of soft electrical glass compositions can be substantially increased by including $Rb_2O$ in the glass in a proportion of at least 1 part $Rb_2O$ to 20 parts total alkali metal oxide. Moreover, these increased resistivities can be obtained without appreciably altering other advantageous properties of the glasses, if so desired, since it is possible to maintain the total moles of alkali metal oxides in a given weight of these glasses the same as in the prior glasses.

More specifically, we have found that soft electrical glasses containing about 5% to 60% PbO, about 5% to 25% alkali metal oxides, and more than 15% $SiO_2$ and optionally containing up to a total of 20% of other compatible inorganic oxides such as $Al_2O_3$, MgO, CaO, and BaO, have substantially higher resistivities when sufficient $Rb_2O$ is present in the glass so that the ratio of $Rb_2O$ to the total alkali metal oxide content is at least 1/20. Compositions containing a smaller proportion of the alkali metal oxide as $Rb_2O$ do not exhibit a substantial increase in resistivities. While there does not appear to be an upper limit to the proportion of alkali metal oxide which can be added as $Rb_2O$, for practical reasons we prefer not to exceed the proportion of 3 parts $Rb_2O$ to 10 parts total alkali metal oxide.

Glasses containing by weight less than 15% $SiO_2$, less than 5% PbO, or more than 60% PbO are generally not used for the purposes of this invention. There is no definite upper limit for the alkali metal oxides, but on account of the approach of instability and for other practical reasons we prefer to use not more than a total of about 25% of the latter.

Other compatible oxides may be added in total amounts by weight not exceeding 20% to modify other desirable qualities to the glass. Thus alumina may be added in an amount up to 5% to increase the chemical durability of the glass and decrease its tendency to devitrify. Glass modifiers of the second group in the periodic table such as CaO, BaO, and MgO, may be added individually or in combination in amounts not exceeding 15%, to effect small changes in working properties such as melting temperature or annealing point.

Table I sets forth the compositions of glasses, in parts by weight calculated from the batch, embodying the advantages of this invention together with the resistivities of each composition measured at 250° C. and 350° C. The measured resistivities of each example were compared to the resistivities of a corresponding glass wherein the $Rb_2O$ was replaced by an equal molar amount of $K_2O$ and the weight percent of $SiO_2$ was adjusted to make the substitution possible, and the percentage increase in resistivity achieved by introducing the $Rb_2O$ is shown. Compositions of representative glasses in which $Rb_2O$ is absent are included for purposes of comparison.

Table 1

| Ex. No | 1 | 2 | 3 | 4 | 5 | 6 | 7 |
|---|---|---|---|---|---|---|---|
| $SiO_2$ | 68.7 | 67.0 | 60.4 | 58.7 | 57.0 | 50.4 | 48.7 |
| PbO | 10.0 | 10.0 | 20.0 | 20.0 | 20.0 | 30.0 | 30.0 |
| $Li_2O$ | 0.1 | 0.1 | 0.1 | 0.1 | 0.1 | 0.1 | 0.1 |
| $Na_2O$ | 1.5 | 1.5 | 1.5 | 1.5 | 1.5 | 1.5 | 1.5 |
| $K_2O$ | 16.4 | 14.8 | 18.0 | 16.4 | 14.8 | 18.0 | 16.4 |
| $Rb_2O$ | 3.0 | 6.0 | | 3.0 | 6.0 | | 3.0 |
| $Cs_2O$ | 0.3 | 0.6 | | 0.3 | 0.6 | | 0.3 |
| $Sb_2O_3$ | 0.3 | 0.3 | 0.3 | 0.3 | 0.3 | 0.3 | 0.3 |
| Res. 250° C.×10⁻⁸ (ohm.-cm.) | 2.9 | 3.8 | 3.8 | 6.2 | 8.6 | 6.6 | 10.8 |
| Res. 350° C.×10⁻⁶ (ohm.-cm.) | 4.7 | 4.7 | 6.1 | 8.5 | 10.7 | 9.3 | 12.2 |
| Incr. Res. 250° C. (Percent) | 81 | 138 | | 63 | 126 | | 64 |
| Incr. Res. 350° C. (Percent) | 42 | 42 | | 39 | 75 | | 31 |

| Ex. No | 8 | 9 | 10 | 11 | 12 | 13 |
|---|---|---|---|---|---|---|
| $SiO_2$ | 47.0 | 38.7 | 37.0 | 30.4 | 28.7 | 27.0 |
| PbO | 30.0 | 40.0 | 40.0 | 50.0 | 50.0 | 50.0 |
| $Li_2O$ | 0.1 | 0.1 | 0.1 | 0.1 | 0.1 | 0.1 |
| $Na_2O$ | 1.5 | 1.5 | 1.5 | 1.5 | 1.5 | 1.5 |
| $K_2O$ | 14.8 | 16.4 | 14.8 | 18.0 | 16.4 | 14.8 |
| $Rb_2O$ | 6.0 | 3.0 | 6.0 | | 3.0 | 6.0 |
| $Cs_2O$ | 0.6 | 0.3 | 0.6 | | 0.3 | 0.6 |
| $Sb_2O_3$ | 0.3 | 0.3 | 0.3 | 0.3 | 0.3 | 0.3 |
| Res. 250° C.×10⁻⁸ (ohm.-cm.) | 13.5 | 9.4 | 11.6 | 5.0 | 5.6 | 2.9 |
| Res. 350° C.×10⁻⁶ (ohm.-cm.) | 14.4 | 8.5 | 8.9 | 4.1 | 5.8 | 6.1 |
| Incr. Res. 250° C. (Percent) | 105 | 34 | 66 | | 65 | 279 |
| Incr. Res. 350° C. (Percent) | 44 | 18 | 24 | | 16 | 22 |

Table I—Continued

| Ex. No. | 14 | 15 | 16 | 17 | 18 | 19 |
|---|---|---|---|---|---|---|
| $SiO_2$ | 68.8 | 59.7 | 58.8 | 58.0 | 49.7 | 48.8 |
| PbO | 20.0 | 30.0 | 30.0 | 30.0 | 40.0 | 40.0 |
| $Li_2O$ | 0.1 | 0.1 | 0.1 | 0.1 | 0.1 | 0.1 |
| $Na_2O$ | 1.2 | 1.2 | 1.2 | 1.2 | 1.2 | 1.2 |
| $K_2O$ | 8.2 | 9.0 | 8.2 | 7.4 | 9.0 | 8.2 |
| $Rb_2O$ | 1.5 | | 1.5 | 3.0 | | 1.5 |
| $Cs_2O$ | 0.2 | | 0.2 | 0.3 | | 0.2 |
| $Sb_2O_3$ | 0.3 | 0.3 | 0.3 | 0.3 | 0.3 | 0.3 |
| Res. 250° C.×10⁻¹⁰ (ohm.-cm.) | 3.5 | 6.4 | 8.4 | 21.1 | 1.7 | 2.3 |
| Res. 350° C.×10⁻⁸ (ohm.-cm.) | 3.2 | 5.6 | 6.8 | 9.4 | 11.1 | 13.6 |
| Incr. Res. 250° C. (Percent) | 46 | | 31 | 230 | | 109 |
| Incr. Res. 350° C. (Percent) | 10 | | 22 | 68 | | 23 |

| Ex. No. | 20 | 21 | 22 | 23 | 24 |
|---|---|---|---|---|---|
| $SiO_2$ | 48.0 | 38.8 | 38.0 | 39 | 39 |
| PbO | 40.0 | 50.0 | 50.0 | 51.5 | 51.5 |
| $Li_2O$ | 0.1 | 0.1 | 0.1 | | |
| $Na_2O$ | 1.2 | 1.2 | 1.2 | 0.2 | 0.2 |
| $K_2O$ | 7.4 | 8.2 | 7.4 | 5.3 | 5.1 |
| $Rb_2O$ | 3.0 | 1.5 | 3.0 | 2.0 | 2.0 |
| $Cs_2O$ | 0.3 | 0.2 | 0.3 | | 0.2 |
| $Sb_2O_3$ | 0.3 | 0.3 | 0.3 | | |
| BaO | | | | 1.5 | 1.5 |
| $As_2O_3$ | | | | 0.5 | 0.5 |
| Res. 250° C.×10⁻¹⁰ (ohm.-cm.) | 2.9 | 2.5 | 3.6 | 89.0 | 112 |
| Res. 350° C.×10⁻⁸ (ohm.-cm.) | 17.2 | 14.8 | 18.8 | 53.6 | 75.8 |
| Incr. Res. 250° C. (Percent) | 164 | 31.8 | 10.9 | 97.8 | 148.0 |
| Incr. Res. 350° C. (Percent) | 55 | 19.1 | 67.2 | 80.0 | 154.2 |

Table II sets forth examples of compositions of glasses, in parts by weight calculated from their batches, wherein similar increases in resistivities are obtained by the presence of $Rb_2O$ in the composition and which contain minor amounts of optional ingredients.

Table II

| Ex. No. | 25 | 26 | 27 | 28 | 29 | 30 |
|---|---|---|---|---|---|---|
| $SiO_2$ | 56.5 | 57.1 | 61.9 | 61.2 | 57.2 | 56.4 |
| PbO | 22.4 | 22.5 | 21.2 | 20.9 | 28.6 | 28.1 |
| $Li_2O$ | 0.2 | 0.2 | 0.1 | 0.1 | 0.1 | 0.1 |
| $Na_2O$ | 2.6 | 2.6 | 7.0 | 6.9 | 3.6 | 3.6 |
| $K_2O$ | 9.6 | 8.5 | 5.4 | 6.1 | 6.5 | 7.4 |
| $Rb_2O$ | 1.0 | 1.9 | 1.8 | 2.1 | 2.4 | 2.8 |
| $Cs_2O$ | 0.1 | 0.2 | 0.2 | 0.2 | .3 | .3 |
| BaO | 5.4 | 5.5 | | | | |
| CaO | 0.6 | 0.6 | 0.1 | 0.1 | | |
| $Al_2O_3$ | 1.2 | 0.6 | 2.1 | 2.1 | 1.0 | 1.0 |
| $As_2O_3$ | 0.2 | 0.2 | .3 | .3 | .3 | .3 |

Although each composition of this invention has particular usefulness for specific purposes, example number 24 is the preferred composition as it has an extremely high electrical resistivity and other physical properties which make it suitable for sealing to Dumet wire.

The preparation of the batch, melting, and forming the glass compositions of this invention are the same as for prior glasses of similar composition without $Rb_2O$ and, therefore are well-known by those skilled in the art. Examples of typical glass batches, which are suitable for preparing glasses according to this invention are presented in Table III and are numbered to correspond to the glass compositions given in Table I.

Table III

| Example | 1 | 2 | 8 | 12 | 16 | 21 | 22 | 24 |
|---|---|---|---|---|---|---|---|---|
| Sand | 274.8 | 268.1 | 188.1 | 143.5 | 235.4 | 194.2 | 190.0 | 195.0 |
| $Li_2CO_3$ | 0.7 | | | 0.9 | 0.35 | 0.45 | | |
| $NaNO_3$ | 11.0 | 11.0 | 11.0 | 13.8 | 11.0 | 13.8 | 13.8 | |
| $Na_2CO_3$ | 1.6 | | | 1.6 | 0.8 | 0.8 | | |
| $K_2CO_3$ | 52.9 | | | 66.1 | 26.5 | 33.1 | | |
| PbO (Litharge) | 40.0 | 40.0 | 120 | 250 | 120 | 300 | 300 | 257.0 |
| $Ba(NO_3)_2$ | | | | | | | | 13.0 |
| Mixed Alkali Carbonates | 63.3 | 126.5 | 126.5 | 79.1 | 31.8 | 39.5 | 79.0 | 55.5 |
| $Sb_2O_3$ | 1.2 | 1.2 | 1.2 | 1.5 | 1.2 | 1.5 | 1.5 | |
| $As_2O_3$ | | | | | | | | 2.5 |

The mixed alkali carbonates are available commercially in a mixture having the following analysis in weight percent:

$K_2CO_3$ ---------- 71  $Na_2CO_3$ ---------- 1.7
$Rb_2CO_3$ ---------- 23  $Li_2CO_3$ ---------- 0.8
$Cs_2CO_3$ ---------- 2.6  Ignition Prod. ---------- 0.9

The $Sb_2O_3$ and $As_2O_3$ function only as fining agents and have no substantial effect on the fundamental properties of the glass, as a considerable portion is volatilized during the melting and fining of the glass. The batches melt readily under oxidizing conditions in a closed pot or in a tank, at about 1350°–1500° C. Preferably, the glass should be stirred during melting and fining in order to minimize cords.

"Alkali-lead-silicate glasses" as hereinafter used in the claims means a glass containing as essential ingredients at least 15% $SiO_2$ as a network former, about 5% to 60% PbO, and a total of about 5% to 25% alkali metal oxides, and optionally containing up to a total of 20% of other compatible inorganic oxides such as $Al_2O_3$, MgO, CaO, and BaO.

What is claimed is:

1. The method of increasing the electrical resistivity of a glass containing as essential ingredients 15–70% $SiO_2$ as a network former, about 5–60% PbO, and a total of about 5–25% alkali-metal oxides, and optionally containing up to a total of 20% of other compatible inorganic oxides, which comprises including in the glass $Rb_2O$ in a ratio of $Rb_2O$ to total alkali metal oxide of about 1/20 to 3/10.

2. A glass composition having an electrical resistivity greater than 1 megohm when measured at a temperature of 250° C. consisting essentially by weight of about 15% to 70% $SiO_2$, 5% to 60% PbO, and 5% to 25% alkali metal oxides characterized in that $Rb_2O$ is present in an amount that the ratio of $Rb_2O$ to alkali metal oxide is about 1/20 to 3/10.

3. A glass composition having an electrical resistivity greater than 1 megohm when measured at a temperature of 250° C. consisting essentially by weight of about 15% to 70% $SiO_2$, 5% to 60% PbO, 5% to 25% alkali metal oxides, 0 to 5% $Al_2O_3$, and a total of 0 to 15% alkaline earth metal oxides selected from the group consisting of MgO, CaO, and BaO, characterized in that $Rb_2O$ is present in an amount that the ratio of $Rb_2O$ to total alkali metal oxide is about 1/20 to 3/10.

4. An alkali-lead-silicate glass of high electrical resistivity consisting essentially of about 39% $SiO_2$, 51.5% PbO, 0.2% $Na_2O$, 5.1% $K_2O$, 2.0% $Rb_2O$, 0.2% $Cs_2O$, 1.5% BaO and 0.5% $As_2O_3$.

References Cited in the file of this patent

UNITED STATES PATENTS 2,782,319  McAlpine et al. _____ Feb. 19, 1957

FOREIGN PATENTS 415,536  Great Britain _____ Aug. 30, 1934
627,442  Great Britain _____ Aug. 9, 1949
574,029  Great Britain _____ Dec. 18, 1945